United States Patent
Okamoto

[11] Patent Number: 6,036,372
[45] Date of Patent: Mar. 14, 2000

[54] BEARING ASSEMBLY WITH LOCKING COLLAR

[75] Inventor: Masaki Okamoto, Kawachi-Nagano, Japan

[73] Assignee: AMI Bearings, Inc., Mt. Prospect, Ill.

[21] Appl. No.: 09/127,504

[22] Filed: Jul. 31, 1998

[51] Int. Cl.[7] .................................................. F16C 35/063
[52] U.S. Cl. .......................................... 384/537; 384/585
[58] Field of Search .................................. 384/537, 538, 384/540, 541, 542, 584, 585

[56] References Cited

U.S. PATENT DOCUMENTS

| | | | |
|---|---|---|---|
| 3,276,828 | 10/1966 | Mansfield | 384/585 |
| 4,537,519 | 8/1985 | LaRou et al. | 384/478 |
| 4,728,202 | 3/1988 | LaRou | 384/537 |
| 5,228,787 | 7/1993 | Lawson | 384/535 |
| 5,269,607 | 12/1993 | Lawson | 384/538 |
| 5,417,500 | 5/1995 | Martinie | 384/513 |
| 5,678,949 | 10/1997 | Swinley | 403/362 |
| 5,685,650 | 11/1997 | Martinie et al. | 384/538 |
| 5,709,483 | 1/1998 | Martinie | 384/538 |
| 5,863,137 | 1/1999 | Johnson et al. | 384/537 |

FOREIGN PATENT DOCUMENTS 960625  6/1964  United Kingdom ................. 384/541

Primary Examiner—Thomas R. Hannon
Attorney, Agent, or Firm—Gardner, Carton & Douglas

[57] ABSTRACT

A bearing assembly (10) with a locking collar (27) provides a singular means for locking a bearing assembly onto a rotatable shaft (41). The bearing assembly (10) includes an outer bearing race member (18) and an inner bearing race member (12). The inner bearing member (12) has an inside diameter and an axial extension (25). A locking collar (27) is provided having a larger inside diameter (32) and a smaller inside diameter (34). A gap (23) is positioned circumferentially in the locking collar (27), the gap defining opposed separated planes (26, 28) cutting approximately radially through the locking collar. The locking collar (27) can be slidably fitted over the axial extension (25) with the smaller inside diameter (34) of the locking collar positioned at the furthest extent of the axial extension (25). A fastener (46) is provided for compressing the gap (23). In use, the locking collar (27) can be tightened about the axial extension (25) by the fastener (46).

32 Claims, 2 Drawing Sheets

BEARING ASSEMBLY WITH LOCKING COLLAR

FIELD OF THE INVENTION

This invention relates to a bearing assembly with locking collar for use on rotatable shafts.

BACKGROUND OF THE INVENTION

Bearing assemblies with locking collars are known in the art. A problem with these devices is that when mounted on rotatable shafts they generate excessive vibration and noise during use. These bearing assemblies also mar the rotatable shafts. In an attempt to reduce the vibration and noise from the bearing it has been necessary to keep the bearing dimensions to close tolerances. It has also been necessary to keep the shaft true and round to similarly close tolerances. Furthermore, different means to secure the bearing to the shaft have been tried in attempts to reduce the noise and vibration, and to reduce marring of the shaft.

One such means to secure the bearing to the shaft includes the use of a locking collar and slotted axial extensions, or fingers, extending out from the inner race member of the bearing. These bearing assemblies are secured to a shaft by the locking collar that applies a force to the slotted axial extensions. The slotted axial extensions in turn grip the rotatable shaft. Different designs of slotted axial extensions and locking collars have been tried.

One Such locking collar arrangement uses a screw having two different thread diameters to increase the force applied to slotted axial extensions extending from the inner bearing race. The locking collar is a two-piece device secured by tightening screws that are spaced 180° apart. Both collar pieces have internal threads with one collar piece accepting a part of the screw having one diameter, and the other collar piece accepting that part of the screw having the different thread diameter. The slotted axial extensions have a raised end portion defining a groove between the slotted axial extensions and the locking collar. Because of this groove, the locking collar only contacts the end portion of the slotted axial extensions. In order to secure a bearing assembly in a concentric position with respect to the rotatable shaft, both screws must be tightened to the same extent.

In one such slotted axial extension arrangement, the slotted axial extensions have a raised end portion that defines a recessed annular groove between it and the locking collar. The end portions of the slotted axial extensions are of sufficient breadth and depth to convert what would otherwise be a shearing force to a bending force, thus, apparently, improving the bearing's ability to handle radial torque and thrust.

Another locking collar arrangement makes use of a tapered adapter and an extension from the inner bearing race. The exterior surface of the tapered adapter and the interior surface of the inner bearing race, and its extension, have complimentary tapers so that the tapered adapter fits between the bearing with extension and the rotatable shaft. The extension is threaded and accepts a threaded locking collar. There is a further groove defined in the outside diameter of the extension that accepts a corresponding lip in the leading edge of the threaded locking collar. The locking collar attaches to the tapered adapter and bearing. The locking collar then must be tightened onto the threaded extension so as to drive the tapered adaptor between the extension and rotatable shaft and engage the groove on the extension in order to secure the bearing assembly to the rotatable shaft.

Yet another locking collar arrangement employs a compressible locking ring together with a tapered adapter and an extension from the inner bearing race. Similar to the device described above, the exterior surface of the tapered adapter and the interior surface of the inner bearing race, and its extension, have complimentary tapers so that the tapered adapter fits between the bearing with extension and the rotatable shaft. The extension is threaded and accepts a threaded locking collar. In this device, however, the compressible locking ring fits into a groove in the tapered adapter. The locking collar has internal threads that engage external threads on the tapered adapter. The locking collar also has a groove that accommodates the top of the compressible locking ring. The procedure to secure the bearing assembly to the rotatable shaft is similar to that described above, but with the further step of attaching the compressible locking ring to the groove in the tapered adaptor.

One bearing assembly uses radially acting screws in a locking collar to press down on a tapered extension from the bearing inner race member. The inside diameter of the tapered extension is the same as the diameter of the inner race member that fits around the rotatable shaft. The outside diameter of the extension is tapered either towards the inner race member or away from it. The radially acting screws are spaced around the locking collar and when tightened bind down on the extension. Every radial screw must be properly tightened to secure a bearing assembly to a shaft using this locking collar arrangement. Also, to secure the bearing assembly in a concentric relationship to the shaft, each radial screw must be tightened to the proper extent.

Another bearing assembly employs a threaded extension from the inner race member and a threaded locking collar as part of the means to secure the bearing to a rotatable shaft. The locking collar has an inside flange. A wedge ring and conical washer are interposed between the locking collar and the end of the extension. The wedge ring has a thick portion and thin portion. The extension has a tapered end section that accepts the wedge ring, with the thick portion of the wedge ring extending slightly beyond the end of the extension. The conical washer abuts the thick portion of the wedge ring and the locking collar flange presses up against the conical washer. By tightening the locking collar, the conical washer presses the wedge ring between the extension and rotatable shaft thereby securing the bearing assembly to the rotatable shaft. To secure a bearing assembly to a shaft using this locking collar arrangement each component must be properly assembled.

Each of the above devices for securing a bearing assembly to a shaft has to some extent proven unreliable or cumbersome. Each of these devices requires numerous steps to secure the bearing assembly to a rotatable shaft using the locking collar. None of these devices provides means to readily compensate for irregularly shaped shafts or shafts of a nominal diameter but having a range of different dimensional tolerances. This can lead to bearings that are not truly secured to the rotatable shaft or to bearings that are not mounted concentrically. Both situations may cause the device in which the shaft functions to operate with excessive noise or vibration. Both situations may also lead to damage of the shaft or the device in which the shaft functions.

What would therefore be advantageous is a bearing assembly and locking collar that has fewer assembly steps than the prior art devices. It would be further advantageous to have a bearing assembly and locking collar that readily secures a bearing to a rotatable shaft. It would be yet another advantage to have a bearing assembly and locking collar that could readily accommodate irregular shafts and variations in shaft tolerances. It would be still another advantage to have a bearing assembly that reduces marring of a rotatable shaft when mounted on the shaft.

SUMMARY OF THE INVENTION

The present invention provides a bearing assembly and locking collar that accommodates shafts having irregular diameters or variations in diameter tolerances while maintaining a high degree of concentricity with respect to the rotatable shaft. Furthermore, the present invention provides a means to lock a bearing assembly onto a rotatable shaft and thereby reduce noise and vibration that might otherwise occur with use of the device containing the rotatable shaft. The present invention also provides a means to lock a bearing assembly onto a rotatable shaft and thereby reduce marring of the shaft.

The present invention provides a bearing assembly with a locking collar and provides a singular means for locking a bearing assembly onto a rotatable shaft. The bearing assembly made in accordance with the principles of the present invention includes an outer bearing race member and an inner bearing race member. The inner bearing member has an inside diameter and an axial extension. A locking collar is provided having a larger inside diameter and a smaller inside diameter. A gap is positioned circumferentially in the locking collar, the gap defining opposed separated planes cutting approximately radially through the locking collar. The locking collar can be slidably fitted over the axial extension with the smaller inside diameter of the locking collar positioned at the furthest extent of the axial extension. A fastener is provided for compressing the gap. In use, the locking collar can be tightened about the axial extension by the fastener.

DETAILED DESCRIPTION OF THE INVENTION

Figure 1:
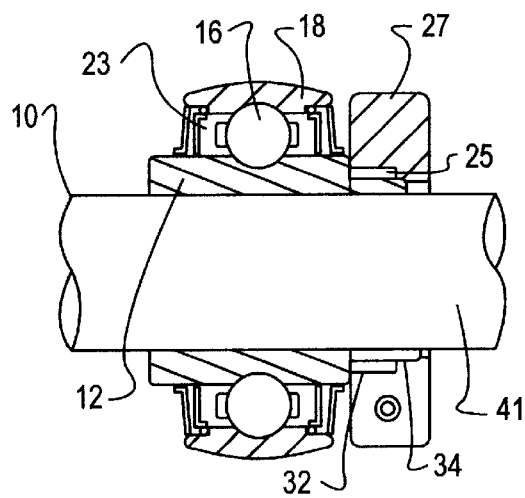
FIG. 1 is a cross-sectional view of an embodiment of the bearing assembly and locking collar made in accordance with the principles of the present invention mounted on a rotatable shaft.

In FIG. 1, a bearing assembly with locking collar made in accordance with the principles of the present invention is labeled (10). The locking collar (27) is made so that it has two interior diameters, a larger diameter (32) and a smaller diameter (34). These two diameters may have a stepped-surface disposed between them, whereby there is sudden change in diameter, but a tapered surface, whereby there is gradual change in diameter, is also anticipated. The bearing assembly includes an inner race member (12) and an outer race member (18). The inner race member (12) and the outer race member (18) together define an annulus (23) that is capable of containing a bearing element (16). The bearing element pictured in FIG. 1 is a ball bearing, but other bearing elements known in the art are contemplated.

Axial extension (25) is unitary with and extends from the inner race member (12). The axial extension (25) has a cross-sectional dimension or thickness that is thin enough to bend or deform under the load produced by the locking collar (27) but thick enough to withstand the forces that are setup in a rotating shaft and associated device. Also, the axial extension (25) is of approximately constant thickness.

In a preferred orientation, the locking collar (27) is slidably fit over the axial extension (25). The locking collar (27) is positioned so that its smaller diameter surface is placed at the furthest extent of the axial extension (25) away from the inner race member (12), while its larger diameter surface is placed at the relatively closer extent of the axial extension (25) to the inner race member (12).

Figure 2:
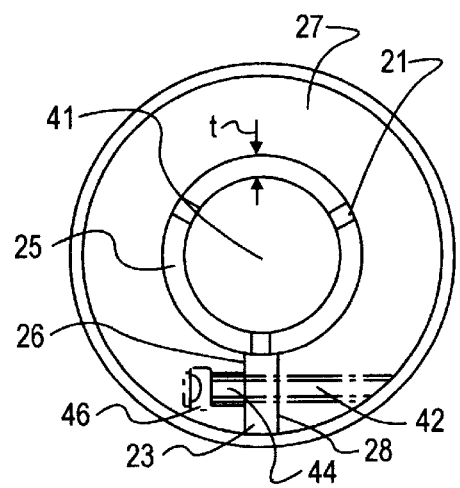
FIG. 2 is a schematic showing an end-view of the bearing assembly and locking collar of FIG. 1 mounted on a rotatable shaft.

Referring now to FIG. 2, the bearing assembly and locking collar (10) of FIG. 1 is depicted schematically in an end-view. The axial extension (25) includes a cross-sectional dimension or thickness (t). This cross-sectional dimension, (t), is an average thickness measured perpendicular to the long axis of the axial extension (25). Generally, the axial extension (25) will have a thickness from about 0.0125 inch to about 0.50 inch, but is approximately constant for any one bearing assembly. Of course, this thickness will vary with the bearing size and the forces to which it will be exposed. In a preferred embodiment, the axial extension (25) shown in FIG. 2 is slotted. Spaces (21) between individual extensions of the axial extension (25) are also shown in FIG. 2.

To secure the bearing assembly (10) to the rotatable shaft (41), the locking collar (27) is fit over the axial extension (25) and compression means force the axial extension (25) to grip the shaft (41). Compression means acts across a gap (23) in the locking collar (27). The gap (23) further defines opposed separated planes (26) and (28) cutting approximately radially through the locking collar (27). By application of the compression means the gap (23) is made narrower by drawing the opposed separated planes (26, 28) closer to each other. Thus a force is exerted on axial extension (25) thereby securing the bearing assembly (10) against the rotatable shaft (41).

Compression means includes different means for narrowing the gap in the locking collar by drawing together the opposed separated planes. In this way, the smaller diameter surface of the locking collar applies a force to the axial extension which in turn grips the rotatable shaft. FIG. 2 illustrates one embodiment in which compression means includes a threaded bore (42) through one opposed separated plane (26), a smooth bore (44) through the other opposed separated plane (28), and a threaded fastener (46) that threadably engages the threaded bore (42). When the threaded fastener is screwed into the threaded bore, the gap in the locking collar is narrowed thus tightening the slotted axial extensions about the rotatable shaft. In another embodiment, compression means includes a smooth bore through both opposed separated planes and a fastener comprising a nut and bolt. The nut and bolt are tightened with respect to each other thereby locking the bearing assembly onto the rotatable shaft. While two compression means have been described, any equivalent means for drawing the opposed separated planes together may be used.

Figure 3:
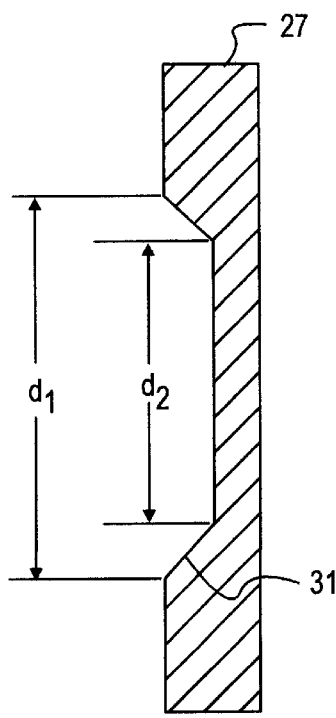
FIG. 3 is a cross-sectional schematic of the locking collar of FIG. 1.

The locking collar (27) of FIG. 2 is depicted in cross-sectional view in FIG. 3. The smaller inside diameter ($d_2$) and the larger inside diameter ($d_1$) are both defined. These two inside diameters are connected by a tapered surface (31).

Figure 4:
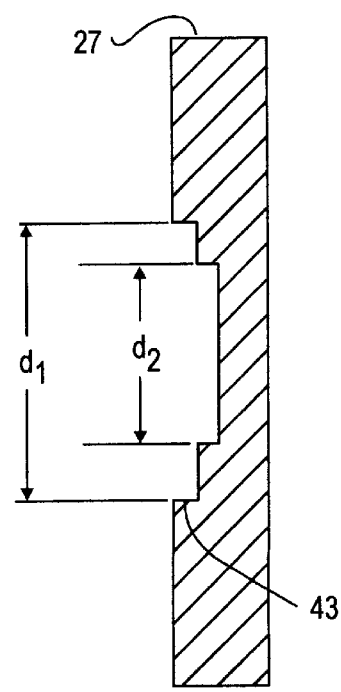
FIG. 4 is a cross-sectional schematic of an alternative embodiment of a locking collar made in accordance with the principles of the present invention.

Another embodiment of a locking collar (27) made accordance with the principles of the present invention is depicted in FIG. 4. As in the previous embodiment, a smaller inside diameter ($d_2$) and a larger inside diameter ($d_1$) are both defined. These two inside diameters are connected by a stepped surface (43).

Figure 5:
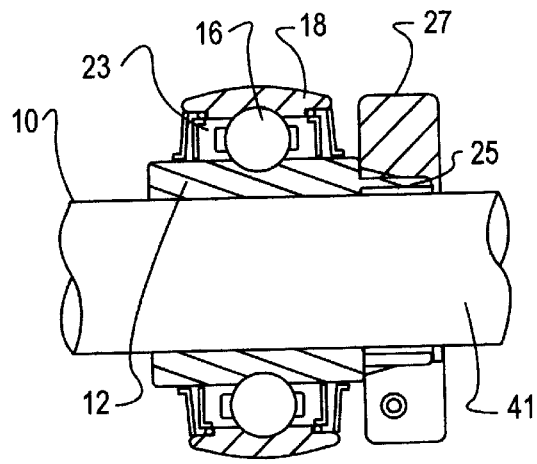
FIG. 5 is a cross-sectional view of another embodiment of a bearing assembly and locking collar made in accordance with the principles of the present invention mounted on a rotatable shaft.
Figure 6:
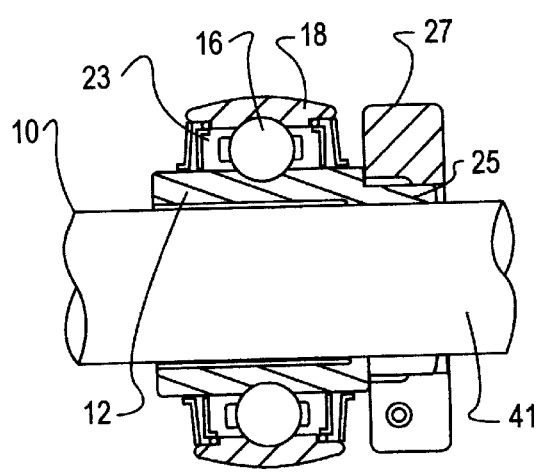
FIG. 6 is a cross-sectional view of yet another embodiment of a bearing assembly and locking collar made in accordance with the principles of the present invention mounted on a rotatable shaft.

FIG. 5 depicts an alternative embodiment of a bearing assembly and locking collar (10), made in accordance with the principles of the present invention. In this embodiment, the axial extension (25) has an inside diameter that is larger than the outside diameter of the shaft (41). In this way irregularities in the shape of the shaft, or variations in dimensional tolerances, can be accommodated. In a similar fashion, FIG. 6 depicts yet another embodiment of a bearing assembly and locking collar (10) made in accordance with the present invention. Here, the axial extension (25) has an inside diameter that is smaller than the inside diameter of the inner race member (12). In this way undersized shafts can be accommodated. In both of these embodiments, the locking collar (27) tightens about the axial extension (25) by application of compression means to grip the shaft (41).

Figure 7:
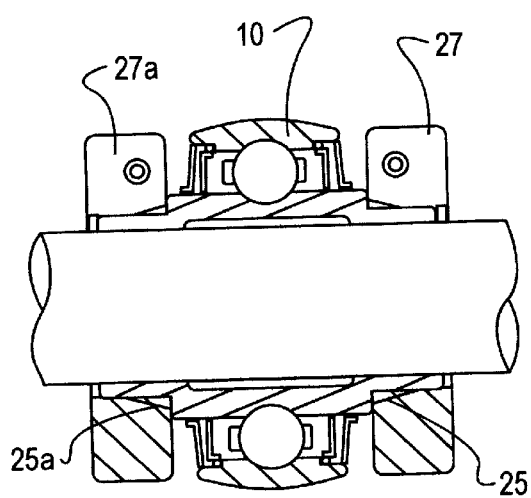
FIG. 7 is a cross-sectional view of still another embodiment of a bearing assembly and locking collar made in accordance with the principles of the present invention mounted on a rotatable shaft.

In FIG. 7, yet another embodiment of the bearing assembly and locking collar (10) made in accordance with the principles of the present invention is seen. In this embodiment, two locking collars, labeled (27) and (27a), are used to secure the bearing assembly (10) to the rotatable shaft (41). The bearing assembly (10) has axial extensions (25) and (25a) extending out from both ends of the inner race member (12). Compression means tighten the locking collars (27) and (27a) about the axial extension (25) and (25a) to grip the shaft (41).

The locking collar made in accordance with the principles of the present invention allow the locking collar to uniformly grip the axial extension under varying shaft geometries. It is not required that the axial extension sits concentrically about the shaft. The locking collar, by virtue of its design, will slidably fit over the axial extension regardless of the irregularity in the surface of the rotatable shaft. Once tightened, the locking collar will position the bearing assembly concentrically on the rotatable shaft. This ability to position the bearing assembly results in a bearing assembly that performs its function with greatly reduced vibration and noise when compared to the prior art devices. This is because the locking collar of the present invention locates the bearing assembly concentrically on the rotatable shaft to within a very small tolerance. Thus shaft vibration and noise due to a bearing assembly being mounted off-center relative to the rotatable shaft are avoided.

There has been provided, in accordance with the present invention, a bearing assembly and locking collar, a locking collar for use on bearing assemblies having slotted axial extensions, and rotatable shaft devices employing the bearing assembly and locking collar of the present invention. While the invention has been described with specific embodiments, many alternatives, modifications and variations will be apparent to those skilled in the art in light of the foregoing description. Accordingly, it is intended to include all such alternatives, modifications and variations set forth within the spirit and scope of the appended claims.

What is claimed is:

1. A bearing assembly comprising:

an outer bearing race member;

an inner bearing race member having an inside diameter and an axial extension;

a locking collar having a larger inside diameter and a smaller inside diameter, the locking collar being adopted to be slidably fit over the axial extension with the smaller inside diameter of the locking collar positioned at the furthest extent of the axial extension;

a gap positioned circumferentially in the locking collar defining opposed separated planes cutting approximately radially through the locking collar; and means for compressing the gap;

wherein the locking collar is adopted to be tightened about the axial extension by the compression means.

2. The bearing assembly of claim 1 wherein the locking collar further defines a tapered surface connecting the larger inside diameter and the smaller inside diameter.

3. The bearing assembly of claim 1 wherein the axial extension extends from one side of the inner race member.

4. The axial extension of claim 3 wherein the thickness of the axial extension is from about 0.0125 inch to about 0.500 inch.

5. The axial extension of claim 4 wherein the thickness is about uniform.

6. The axial extension of claim 4 wherein the axial extension is slotted.

7. The bearing assembly of claim 1 wherein the axial extension extends from both sides of the inner race member.

8. The axial extension of claim 7 wherein the thickness of the axial extension is from about 0.0125 inch to about 0.500 inch.

9. The axial extension of claim 8 wherein the thickness is about uniform.

10. The axial extension of claim 8 wherein the axial extension is slotted.

11. The bearing assembly of claim 1 wherein the compression means comprises a threaded bore through one opposed separated plane, a smooth bore through the other opposed separated plane, and a threaded fastener that threadably engages the threaded bore.

12. The bearing assembly of claim 1 wherein the compression means comprises a smooth bore through both opposed separated planes and a fastener comprising a nut and bolt.

13. The bearing assembly of claim 1 wherein the axial extension has an outside diameter that is larger than the smaller inside diameter of the locking collar.

14. The bearing assembly of claim 1 wherein the axial extension has an outside diameter that is smaller than the smaller inside diameter of the locking collar.

15. The bearing assembly of claim 1 wherein the axial extension has an inside diameter about equal to the inside diameter of the inner bearing race member.

16. A device comprising:

a rotatable shaft;

an outer bearing race member;

an inner bearing race member having an inside diameter and an axial extension;

a locking collar having a larger inside diameter and a smaller inside diameter, the locking collar being adopted to be slidably fit over the slotted axial extensions with the smaller inside diameter of the locking collar positioned at the furthest extent of the axial extension;

a gap positioned circumferentially in the locking collar defining opposed separated planes cutting approximately radially through the locking collar; and means for compressing the gap;

wherein the locking collar is adopted to be tightened about the axial extension by the compression means.

17. The device of claim 16 wherein the locking collar further defines a tapered surface connecting the larger inside diameter and the smaller inside diameter.

18. The device of claim 16 wherein the axial extension extends from one side of the inner race member.

19. The axial extension of claim 18 wherein the thickness of the axial extension is from about 0.0125 inch to about 0.500 inch.

20. The axial extension of claim 19 wherein the thickness is about uniform.

21. The axial extension of claim 18 wherein the axial extension is slotted.

22. The device of claim 16 wherein the axial extension extends from both sides of the inner race member.

23. The axial extension of claim 22 wherein the thickness of the axial extension is from about 0.0125 inch to about 0.500 inch.

24. The axial extension of claim 23 wherein the thickness is about uniform.

25. The axial extension of claim 23 wherein the axial extension is slotted.

26. The device of claim 16 wherein the compression means comprises a threaded bore through one opposed separated plane, a smooth bore through the other opposed separated plane, and a threaded fastener that threadably engages the threaded bore.

27. The device of claim 16 wherein the compression means comprises a smooth bore through both opposed separated planes and a fastener comprising a nut and bolt.

28. The device of claim 16 wherein the axial extension has an outside diameter that is larger than the smaller inside diameter of the locking collar.

29. The device of claim 16 wherein the axial extension has an outside diameter that is smaller than the smaller inside diameter of the locking collar.

30. The device of claim 16 wherein the axial extension has an inside diameter about equal to the inside diameter of the inner bearing race member.

31. A bearing assembly comprising:

an outer bearing race member;

an inner bearing race member having an inside diameter and axial extension;

a locking collar having a larger inside diameter and a smaller inside diameter connected by a tapered surface, the locking collar adopted to be slidably fit over the axial extension with the smaller inside diameter of the locking collar positioned at the furthest extent of the axial extension;

a gap positioned circumferentially in the locking collar, the gap defining opposed separated planes cutting approximately radially through the locking collar, the gap further having a threaded bore through one opposed separated plane and a smooth bore through the other opposed separated plane; and a fastener;

wherein the locking collar is adopted to be tightened about the axial extension by the fastener threadably engaging the threaded bore in the opposed separated plane of the locking collar.

32. A bearing assembly comprising:

an outer bearing race member;

an inner bearing race member having an inside diameter and slotted axial extensions;

a locking collar having a larger inside diameter and a smaller inside diameter connected by a tapered surface, the locking collar being adopted to be slidably fit over the axial extension with the smaller inside diameter of the locking collar positioned at the furthest extent of the axial extension;

a gap positioned circumferentially in the locking collar, the gap defining opposed separated planes cutting approximately radially through the locking collar, the gap further having a smooth bore through one opposed separated plane and a smooth bore through the other opposed separated plane; and a nut with bolt;

wherein the locking collar is tightened about the axial extensions by the nut with bolt.

* * * * *